(12) United States Patent
Erickson et al.

(10) Patent No.: US 6,394,135 B2
(45) Date of Patent: *May 28, 2002

(54) BALANCED PLUG VALVE WITH CONTOUR WALL

(75) Inventors: Irving Erickson, Rockford; Gary Burwell, Belvidere; Bonnie Dickinson, Durand; John Du, Rockford, all of IL (US)

(73) Assignee: Barber-Colman, Loves Park, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,257

(22) Filed: May 18, 1999

(51) Int. Cl.[7] .............................................. A61K 11/07
(52) U.S. Cl. .................. 137/625.38; 251/118; 251/282; 251/325
(58) Field of Search ....................... 137/625.38, 625.39, 137/625.37, 625.35, 625.33; 251/118, 282, 325

(56) References Cited

U.S. PATENT DOCUMENTS

| | | | |
|---|---|---|---|
| 1,208,590 A | * 12/1916 | Lily | 137/625.33 |
| 1,277,153 A | * 8/1918 | Sullivan | 137/625.35 |
| 2,141,614 A | * 12/1938 | Mott | 137/625.33 |
| 2,921,603 A | * 1/1960 | Lofink | 137/625.38 |
| 3,857,542 A | * 12/1974 | Heymann | 251/120 |
| 4,360,370 A | * 11/1982 | McAndrew | 55/302 |
| 4,375,821 A | * 3/1983 | Nanao | 137/239 |
| 4,429,716 A | * 2/1984 | Conrad | 137/625.35 |
| 4,444,222 A | * 4/1984 | Yamagiwa | 137/393 |
| 4,892,118 A | * 1/1990 | Davis et al. | 137/625.3 |
| 5,318,270 A | * 6/1994 | Detanne et al. | 251/120 |

FOREIGN PATENT DOCUMENTS

GB 2067722 * 7/1981 ............ 137/625.38

* cited by examiner

*Primary Examiner*—John Fox
(74) *Attorney, Agent, or Firm*—Leydig, Voit & Mayer, Ltd.

(57) ABSTRACT

There is a balanced plug valve with a contour shaped wall. The contour shaped wall forms a gap with an edge of a balanced plug. Fluid is able to flow through an input port, through the balanced plug, through the gap, and out an output port. The shape of the contour and the relative position of the balanced plug to the contour shaped wall affect the modulation of the rate of the fluid flow through the gap, and thus, through the valve. Multiple possible variations of the dimensions of the contour shaped wall make possible a multitude of flow rate verses valve stroke relationships. Further, the use of a balanced valve decreases friction forces on the plug which allows for smaller, more efficient, and more economical valve actuators.

26 Claims, 11 Drawing Sheets

2  Balanced Plug Valve
Test Result

BALANCED PLUG VALVE WITH CONTOUR WALL

FIELD OF THE INVENTION

The present invention relates to balanced plug valves, and more particularly to balanced plug valves having contoured valve walls, the contour shape being alterable to result in desired flow characteristics.

BACKGROUND OF THE INVENTION

Control systems and manual applications utilize various types of valves to turn fluid flows on and off, and also to modulate the rate of fluid flow through the valve. Fluid flow through a valve results from pressure differentials between upstream sources and downstream destinations. Fluid flow is a function of pressure differentials and conduit resistance. Control is generally achieved by varying the resistance to flow by varying the available flow area between zero and a maximum. A valve is the conventional method of varying area.

Sliding gate valves present one method of varying flow area. However, in such a valve, the differential pressure from the upstream side to the downstream side multiplied by the area of the obstruction separating each side results in a substantial number. This number represents a load on the guides supporting the gate. This load increases friction in a manner proportional to the area and pressure drop. With increased friction, the amount of force required to move the gate increases, thus requiring more powerful actuators. With greater actuator force requirements, costs escalate. Further, control system deadband becomes larger, which negatively affects system stability.

Plug type valves are an additional method of varying flow area. These valves reduce the flow area by forcing a plug into a hole. When the plug is lowered from the upstream side, typically the result is that the plug slams shut against a valve seat due to upstream pressure and inertia forces pushing the plug toward the hole. This slamming causes hammering which creates noise and valve damage. Forcing a plug into a hole from the downstream side can also reduce the flow area. In such a scenario, the obstruction pushes against a substantial opposing force, the force being proportional to hole size and pressure drop between the upstream and downstream sides. With increased opposing forces, the amount of force required to move the plug increases, thus requiring more powerful actuators. Again, with greater actuator force requirements, costs escalate.

In both the gate valve and plug valve instances, the difference in upstream and downstream pressures is the root of their shortcomings. To overcome these shortcomings, balancing of fluid forces is required.

One known arrangement utilizes two circular seats where the pressure forces cancel. These valves are relatively larger and more expensive than the standard gate and plug valves. Further, it is often difficult to ensure proper mechanical closure of both seats.

A second known arrangement utilizes one circular seat with a balancing chamber connected to the upstream pressure with a movable piston tied to a valve stem. These valves are complex, and again more expensive to manufacture.

As an alternative to the aforementioned larger and more costly balanced valves, it is known to create a balanced valve where the flow passes through a balanced plug that is typically in the shape of a cylinder. The cylindrical or other closed perimeter shaped plug that allows fluid to pass through is known as a balanced plug and is a key element in forming a balanced plug valve. The cylinder method successfully eliminates the friction and back pressure forces, thus forming a balanced valve. However, the known cylinder type balanced valves have their own shortcomings. These include the fact that they have poor capability for flow modulation or for tight shut-offs.

In view of the foregoing limitations and shortcomings of the above noted devices, as well as other disadvantages not specifically mentioned, there exists in the art a need for a balanced plug valve with the ability to predictably modulate flow and also provide for tight shut-off of flow.

SUMMARY OF THE INVENTION

The present invention is directed to a balanced plug valve. The valve has a valve body with at least an input port and an output port. Typically, there is a valve bonnet having a side facing an interior of the valve body. The bonnet is removably attached to the valve body at a bonnet aperture. A valve stem is slidably mounted through the bonnet or the valve wall. The valve stem is connected at a first end to an actuator at a location exterior to said valve body. The valve stem has a second end located within the interior of the valve body. A balanced plug is mounted on the interior valve stem end. At least one wall has a contour shape located on the interior. The wall is tightly sealable with the balanced plug at a closed balanced plug position. The wall is dimensioned to form a variable gap with the balanced plug, through which fluid flows, as the balanced plug is displaced. The contour shape, which determines the flow area, influences the fluid flow rate relative to a plug position or displacement.

BRIEF DESCRIPTION OF THE DRAWINGS

The aforementioned objects and advantages, and other features and aspects of the present invention, will become better understood with regard to the following description and accompanying drawings, wherein.

DETAILED DESCRIPTION

Figure 1:
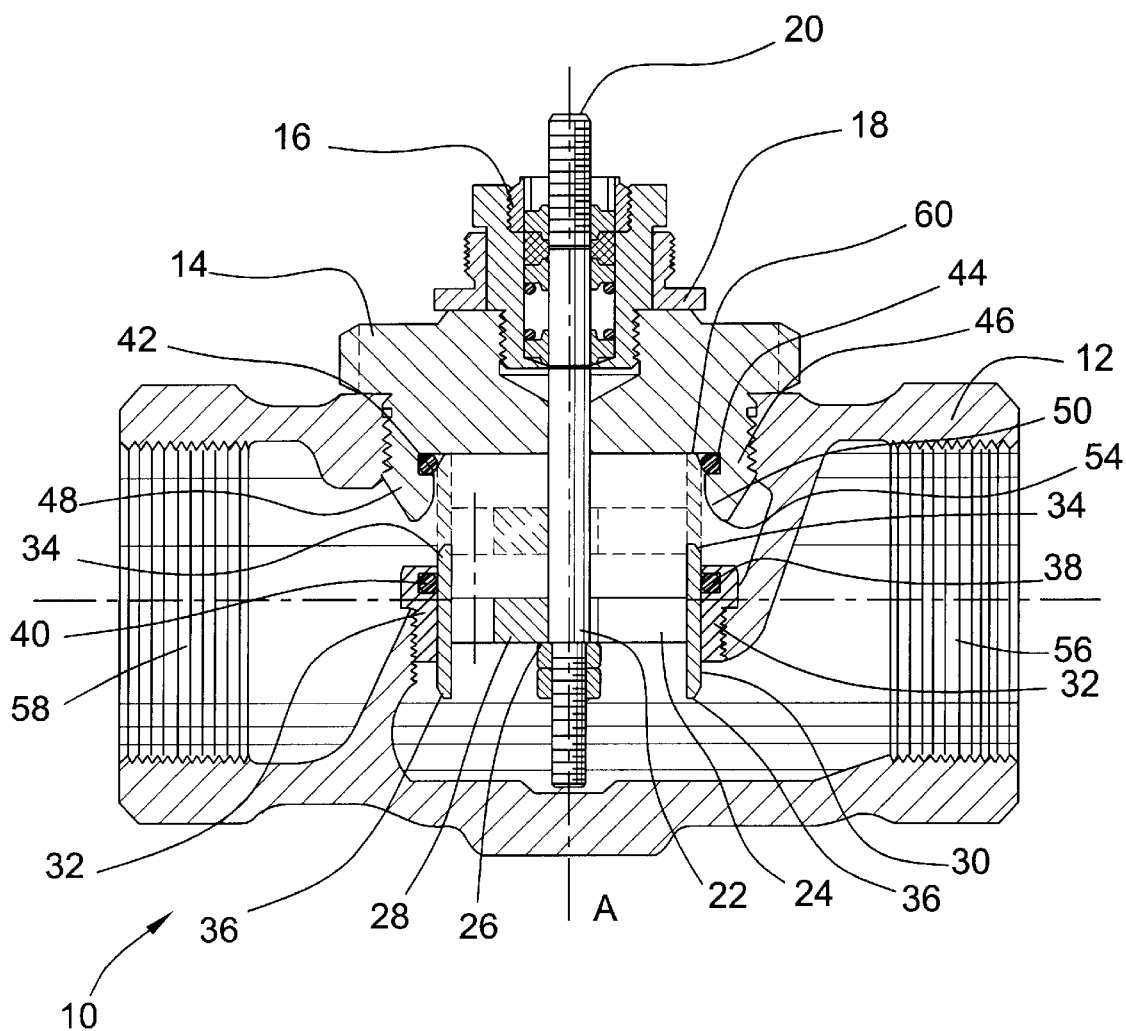
FIG. 1 is a cross-section of a two-way balanced plug valve having contoured walls in accordance with one embodiment of the present invention.
Figure 2:
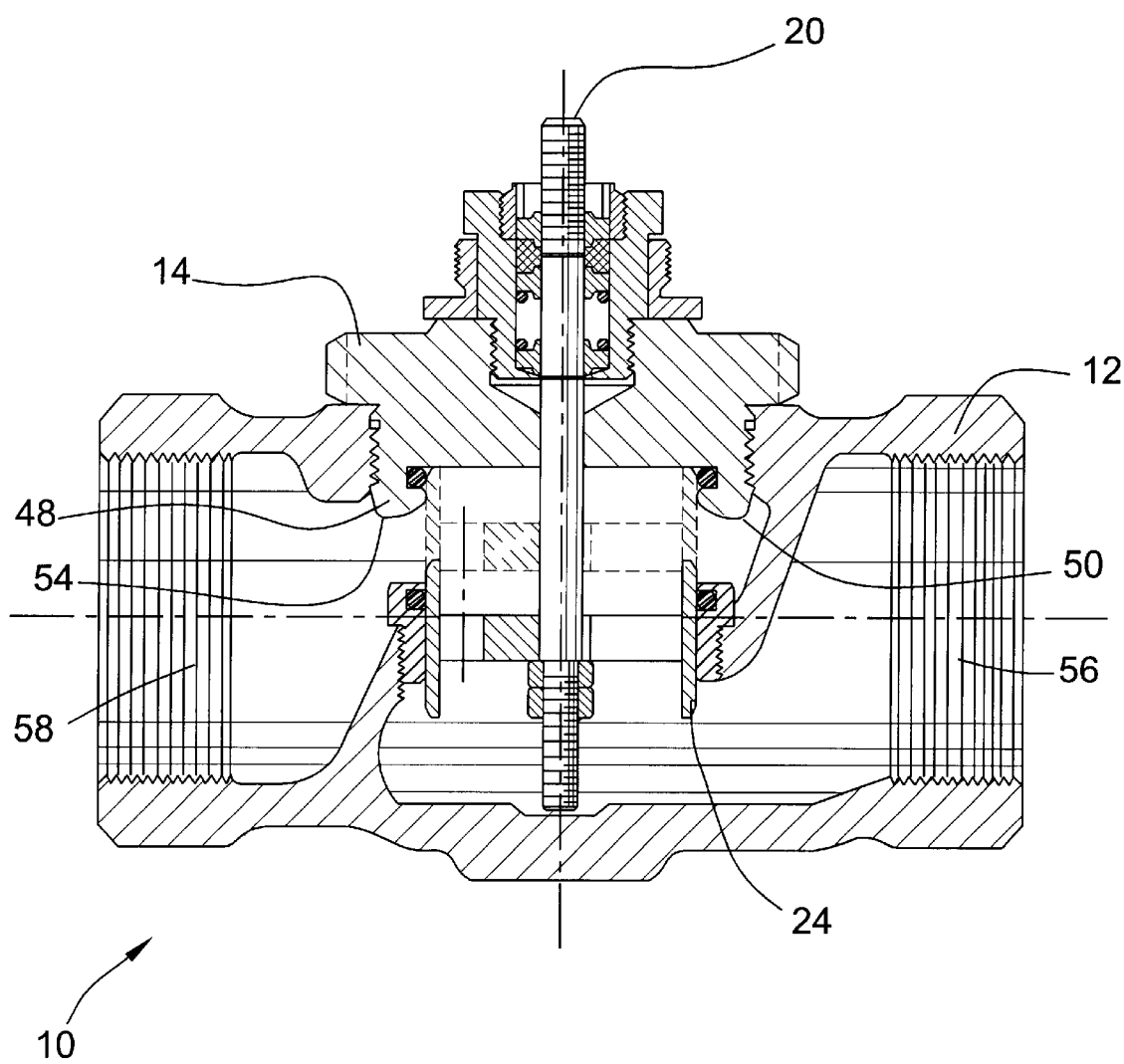
FIGS. 2–5 are cross-section of alternate embodiments of the valve of FIG. 1 having differing contoured wall structures with the contoured walls outside the movable plug.

Referring now in detail to the drawings wherein like parts are designated by like reference numerals throughout, there are illustrated in FIGS. 1–10 multiple embodiments of the present invention.

A cross-sectional schematic of a two-way balanced stem out closed external contoured plug valve 10 is shown in FIG. 1. Contoured plug valve 10 has a valve body 12. Removably secured in an aperture of valve body 12 is a bonnet 14. Valve packing 16 exists on an exterior side of bonnet 14, and is removably mounted in place via mounting nut 18. Slidably mounted within packing 16 and through bonnet 14 is a valve stem 20. Valve stem 20 slides in two directions generally along axis A, to operate the valve. Axis A may be angled with respect to the inlets and outlets for flow efficiency. An actuator (not shown) drives the valve stem 20. Other embodiments may include elements such as knobs, wheels, etc. to drive valve stem 20. At a valve stem end 22 internal to the valve 10, a balanced plug 24 is attached to valve stem 20. Note that the attachment of plug 24 to valve stem 20 may include some play to allow the plug 24 to self-align.

Balanced plug 24 is generally cylindrical in shape, but can be of other closed perimeter shapes. Valve stem 20 is mounted to plug 24 at a center hub 26. Supporting center hub 26 are multiple spokes 28 extending to a perimeter wall 30 of plug 24. Plug 24 is prevented from moving in directions other than generally along axis A by a guide 32 extending from valve body 12. The guide 32 may be integral with valve body 12. The edges 34, 36 of plug 24, are chamfered to allow plug 24 to tightly close against seals without damaging the seals. This feature is described in more detail below.

A sliding seal o-ring 38 is positioned within a groove 40 of guide 32, sealing plug 24 at perimeter wall 30 to block fluid passage between the exterior of the perimeter wall 30 of plug 24 and guide 32. A close-off o-ring seal 42 is positioned within a groove 44 of bonnet 14 to block fluid passage between the exterior of the perimeter wall 30 of plug 24 and bonnet 14 when plug 24 is in a closed position.

Along an interior end 46 of bonnet 14 there is a ridge 48 having an internal contoured wall 50. Ridge 48 has a similar perimeter shape as that of plug 24, but is sized slightly larger such that perimeter wall 30 of plug 24 may fit snugly within an interior of ridge 48. Contour 50 of ridge 48 begins proximal to bonnet groove 44 and close-off o-ring seal 42, and curves outward in a direction away from valve stem 20.

Contour 50 has a radius of curvature that may vary at different locations along contour 50. For example, contour 50 may have a constant radius of curvature. Alternatively, contour 50 may have a relatively large radius of curvature at a location proximal to bonnet groove 44 which gradually decreases until contour 50 ends at a location along a rim 54 of ridge 48 (see FIGS. 4 & 5). In a further embodiment, contour 50 may have a relatively small radius of curvature at a location proximal to bonnet groove 44 which gradually increases until contour 50 ends at a location along rim 54 of ridge 48 (see FIGS. 2 & 3).

The gradual increase and/or decrease of the curvature profile of contour 50 may be determined by formula, or may be determined empirically. For example, the curvature profile may be defined such that the radius of curvature fluctuates up and down along various locations of a single contoured wall 50. In addition, the overall length of contour 50 and the depth of ridge 48 may vary from a relatively smaller ridge 48 and shorter contour 50 to a relatively larger ridge 48 and longer contour 50.

The valve body and parts can be made from any of the conventional valve materials, including but not limited to cast iron, brass, stainless steel, other metallic materials, polymers, or composites.

The particular combination of elements making up contoured plug valve 10 allow the valve to be constructed relatively compact in size. The actual contoured wall 50 itself can be manufactured using a lathe process or screw machines rather than being machined or cast like tapered V-gaps require. This ease of manufacture makes for a more economical cost efficient manufacturing process, and therefore a less expensive balanced plug valve relative to the aforementioned circular seat balanced plug valve devices.

Operationally, contoured wall 50 of the bonnet 14 characterizes the flow of a fluid through valve 10. In a basic flow pattern, the fluid enters the valve, flows through a first port 56, passes through plug 24 (while in an open position), and exits the valve through a second port 58. More particularly, after passing through plug 24, the fluid passes inbetween the chamfered edge 34 of plug 24, and contoured wall 50. The positioning of chamfered edge 34 relative to contour 50 forms a gap 60 through which the fluid must flow. As plug 24 is moved toward bonnet 14 via a force acting on the valve stem 20, gap 60 becomes narrower and the flow is modulated to a lower rate. As plug 24 continues toward contour 50, the flow rate gradually drops, until such time as chamfered edge 34 of plug 24 makes sealing contact with close-off seal 42 and blocks fluid flow. In this position (represented by dotted lines in FIG. 1), valve 10 is closed and there is a tight shutoff of the fluid flow.

The flow rate can likewise be modulated upwards by moving plug 24 toward a fully open position. As plug 24 is lifted off of the close-off seal 42, the flow rate increases at a rate at least partially dependent upon the shape of contour 50. As plug 24 continues toward a fully open position, the flow rate will increase until valve 10 is fully open. The flow rate can be modulated at all points along the valve stroke between the fully opened and fully closed positions through adjustments of the position of plug 24.

By altering the curvature and length dimensions of the contoured edge 52, the dimensions of the gap 60 change. These variations significantly affect the sensitivity and overall ability in controlling the modulation of the flow rate.

Figure 5:
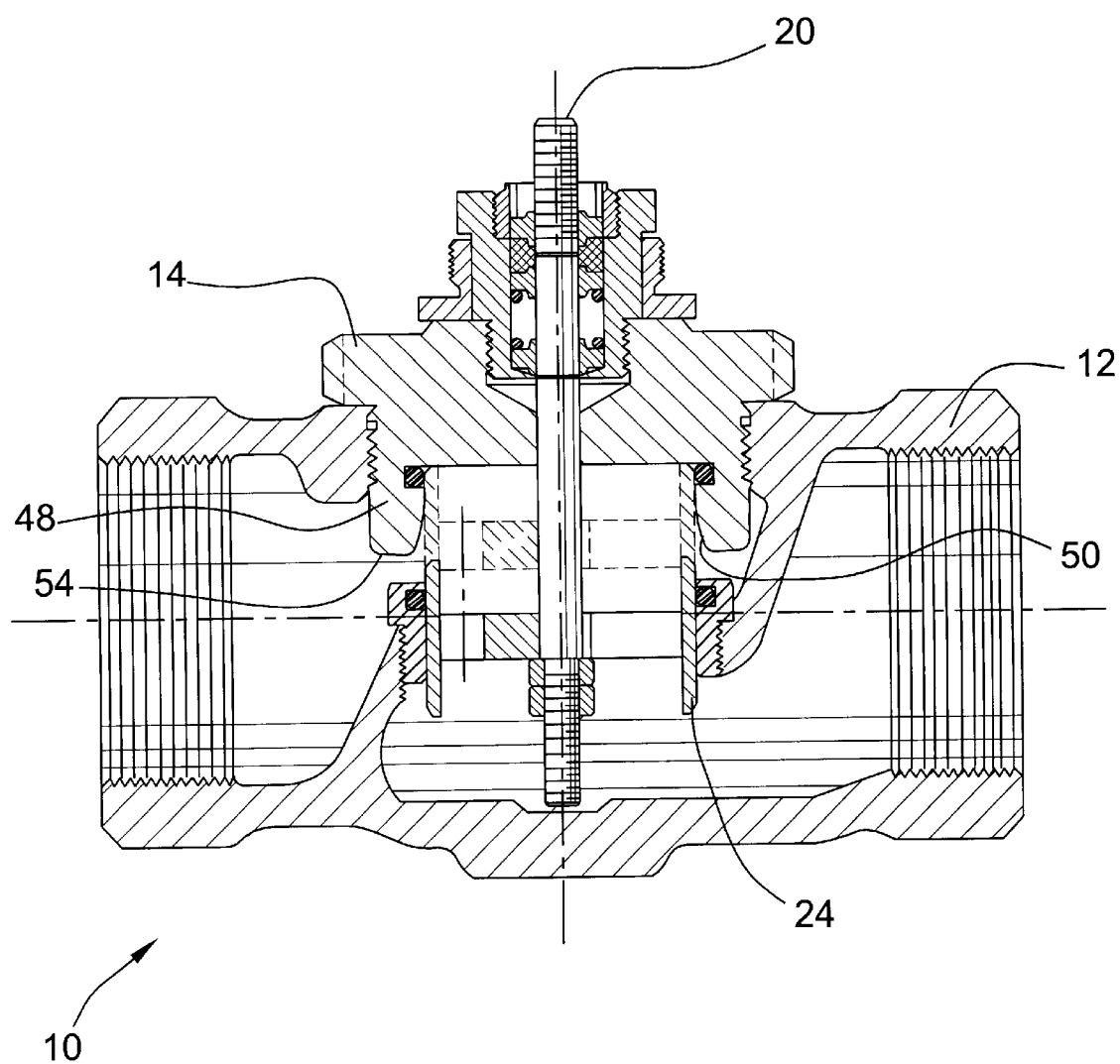

Take, for example, an embodiment where contour 50 has a relatively large radius of curvature at a location on contour 50 proximal to groove 44 in bonnet 14 which gradually decreases as contour 50 extends toward rim 54 (see FIG. 5). Here, plug 24 and valve stem 20 must travel a relatively large distance at the bonnet 14 end of contour 50 to affect the width dimension of gap 60. Thus, there is a relatively large leeway in the position required of the plug 24 to achieve a requisite gap 60 width and flow rate. A relatively significant portion of the valve stroke may be traveled while the flow rate of the fluid is marginally affected.

Figure 3:
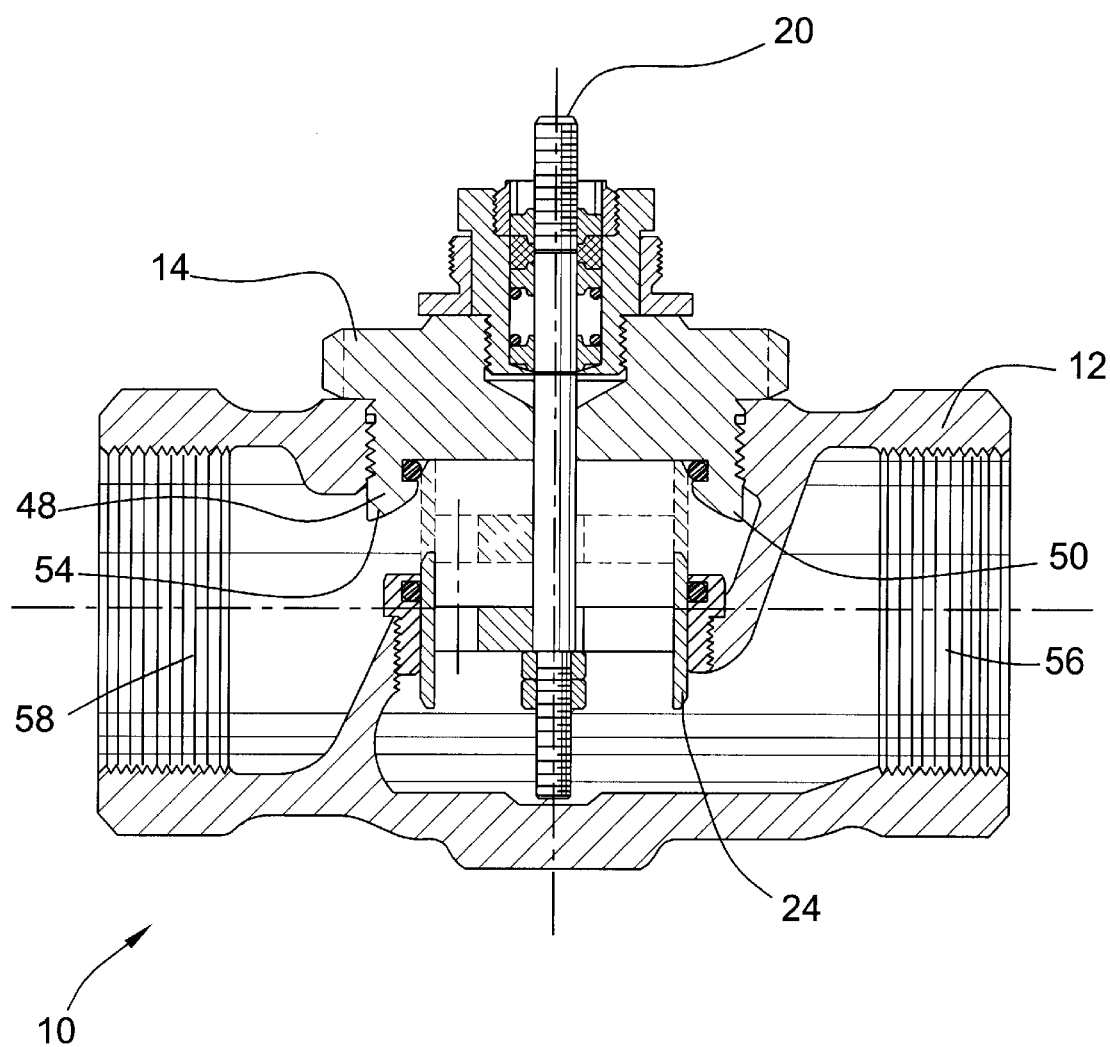
Figure 4:
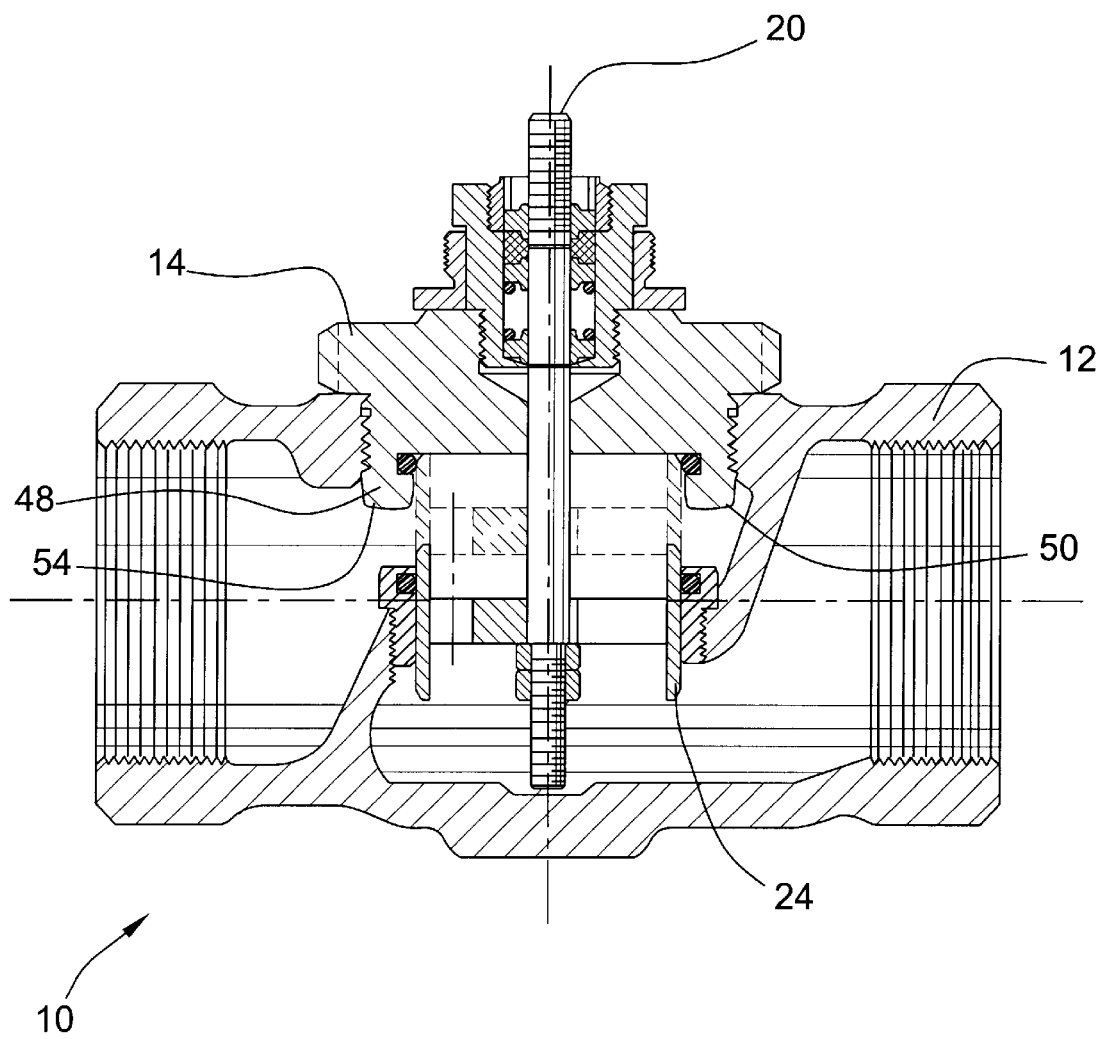

In an alternative embodiment, contour 50 has a relatively small radius of curvature at a location on contour 50 proximal to groove 44 in bonnet 14 which gradually increases as contour 50 extends toward rim 54 (see FIG. 3). Here, plug 24 and valve stem 20 need only travel a relatively small distance at the bonnet 14 end of contour 50 to affect the width dimension of gap 60. Thus, there is almost no leeway in the position required of plug 24 to achieve a requisite gap 60 width and flow rate. However, valve stem 20 need only be moved a small distance to achieve a desired change in the flow rate.

Figure 11:
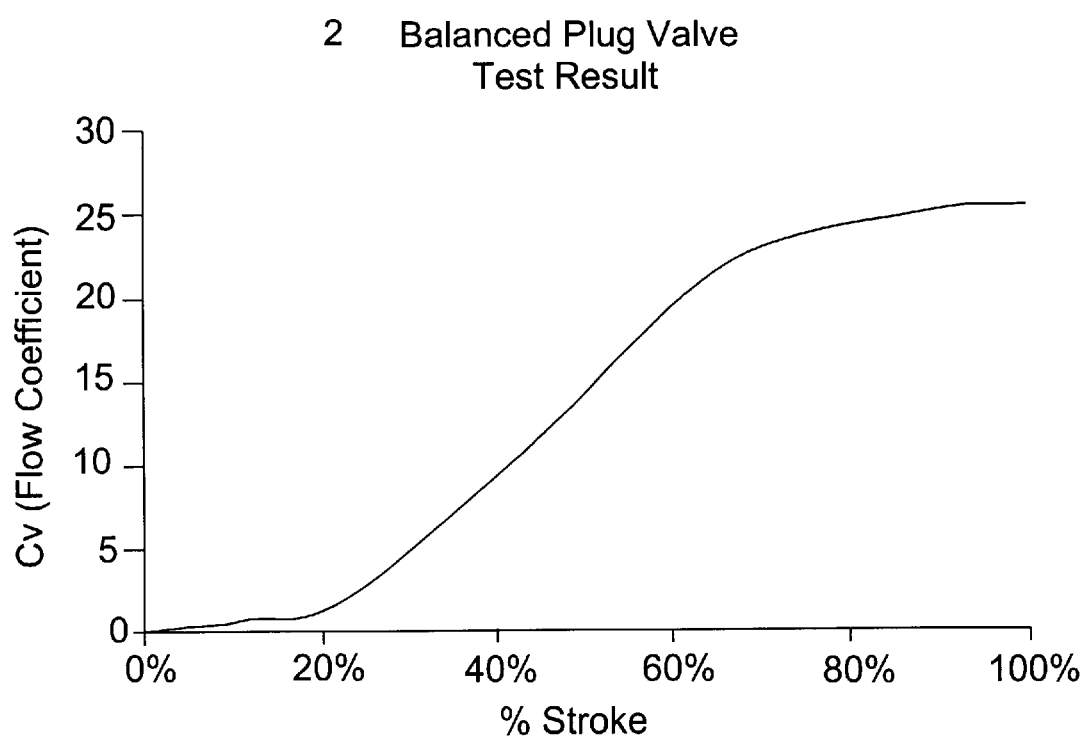
FIG. 11 is a graph plotting the Flow Coefficient vs. the Percentage Stroke of a 2-inch balanced plug valve with contoured wall pursuant to an embodiment of the present invention.

A laboratory test was conducted using a prototype 2-inch balanced plug valve with contoured walls. The contour had a radius of curvature of 0.485 inches. As can be seen in FIG. 11, between approximately 0% and 25% of valve stroke, the flow coefficient (Cv in (gpm)/(sqrt. psi)) increased from 0 to approximately 2.5. This is a slope of approximately 0.1; the slope being a comparative indication of the rate at which the flow rate increases relative to an increase in the gap caused by the actuator moving the plug. This first 25% of valve stroke represents the portion of the curve during which the fluid was flowing around the contoured wall before exiting the port. From approximately 26% valve stroke to 100% valve stroke, the gap provided between the contoured wall and the plug was large enough that the contour had little affect on the flow rate. Between approximately 26% and 68% of valve stroke, the flow coefficient increased from approximately 2.6 to 22. This is a slope of approximately 0.46. The increase in the flow coefficient began to diminish beyond 68% of valve stroke due to other limiting factors such as friction coefficients, shape and size of the ports, and other generally known flow factors not discussed here.

The possible applications of contour 50 for use in valves are plentiful. FIGS. 2–10 are various embodiments in which a contoured wall 50 is useful for the control and modulation of flow rates. FIGS. 2–5 are the same valve structure as that of FIG. 1, but with different variations of the shape of the contoured wall 50. It should be noted that these figures are only representative samples of a few of the multitude of possible contoured wall 50 shapes. A contour shape can have any combination of an infinite number of radii of curvature along a single perimeter edge, which results in the inability to depict herein all possible contoured wall shapes.

Figure 6:
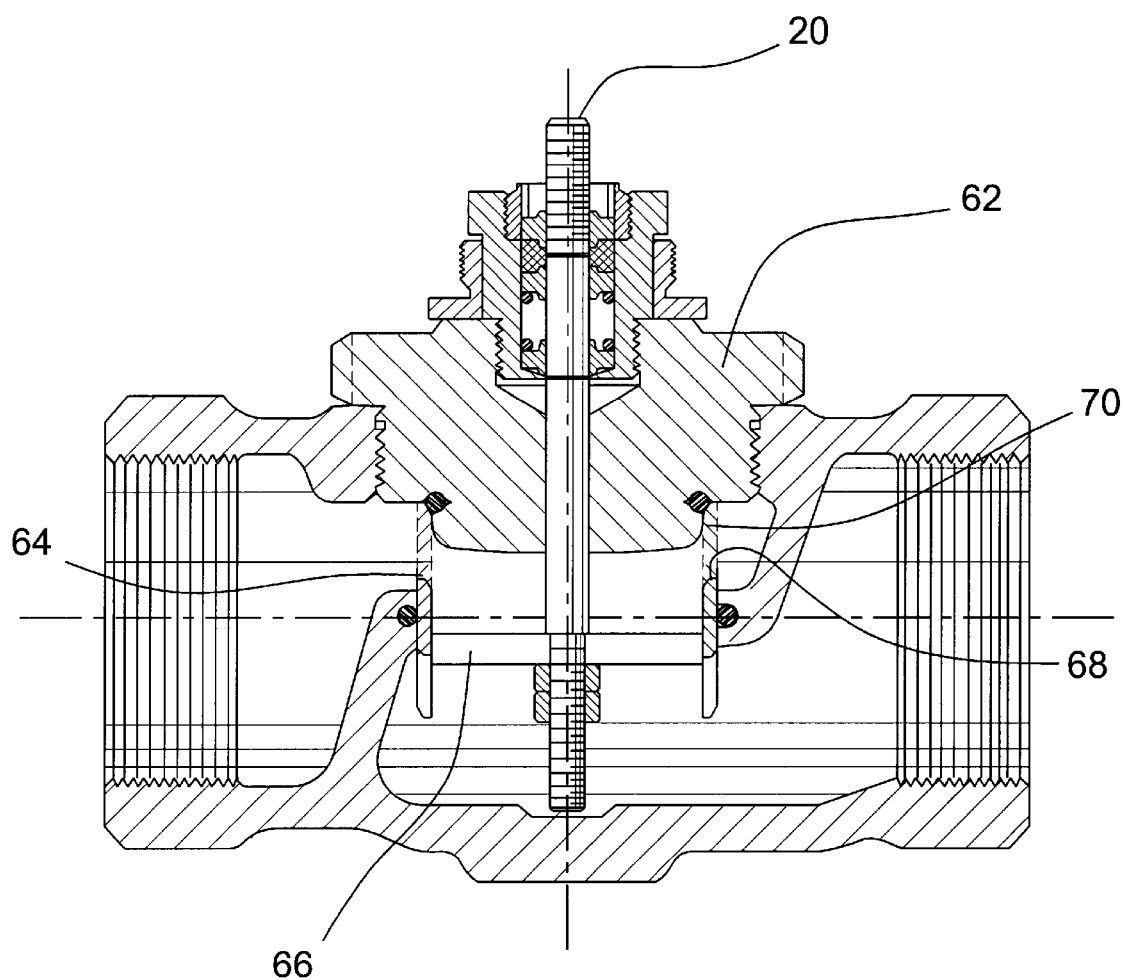
FIGS. 6 is a cross-section of a two-way balanced plug valve of a stem out closed configuration utilizing contoured walls pursuant to an embodiment of the present invention with the contoured walls inside the movable plug.
Figure 8:
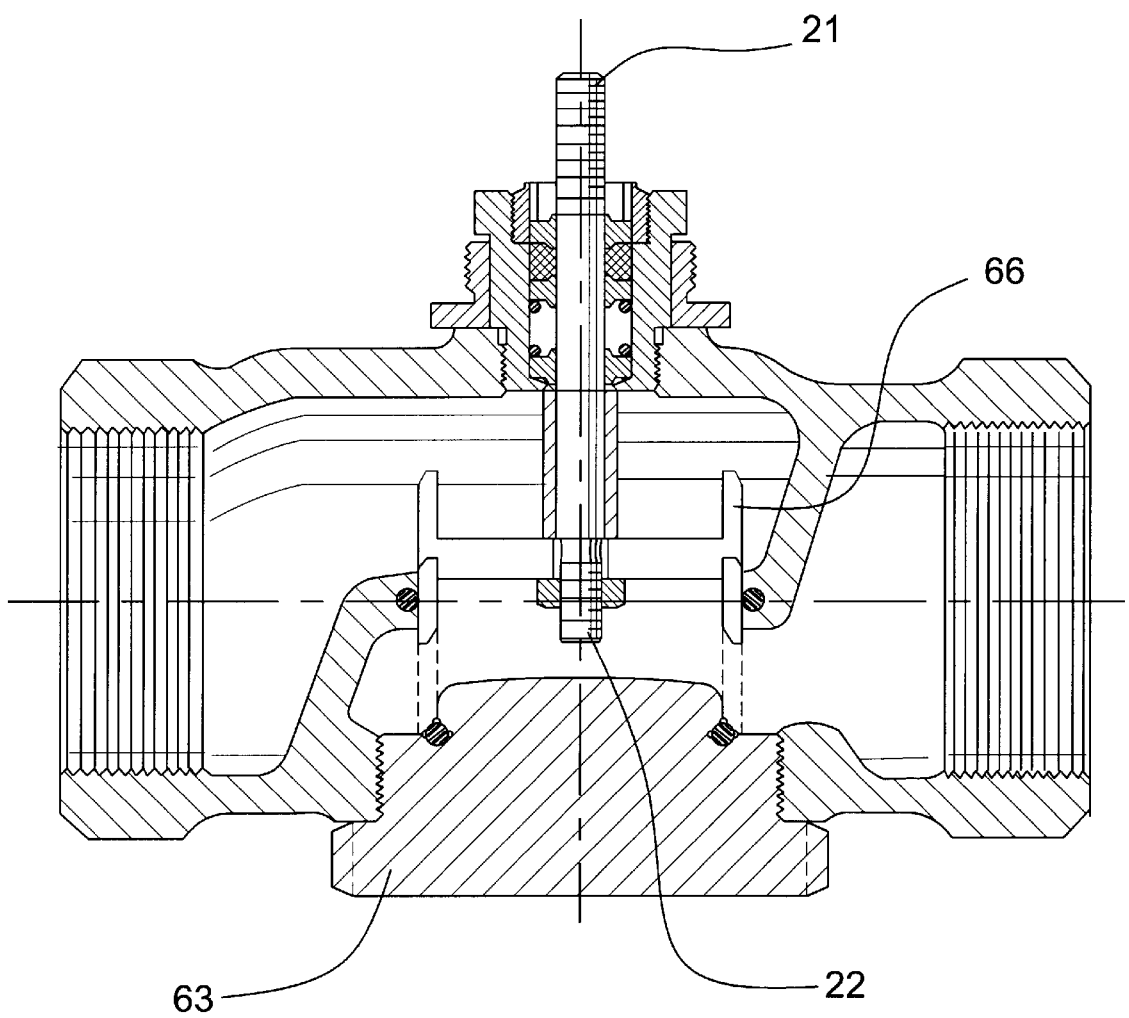
FIG. 8 is a cross-sectional schematic of a similar valve to that of FIG. 7, but with the contoured walls internal to the moveable plug.

FIGS. 6 and 8 are external plug configurations. In such embodiments, an interior portion of bonnet 62 is sized to fit within perimeter wall 64 of plug 66. Plug 66 is chamfered on its internal edge 68 such that it fits snugly around contoured wall 70. Again, contoured wall 70 can be varied in its shape and size to achieve desired flow characteristics relative to valve stroke.

Figure 7:
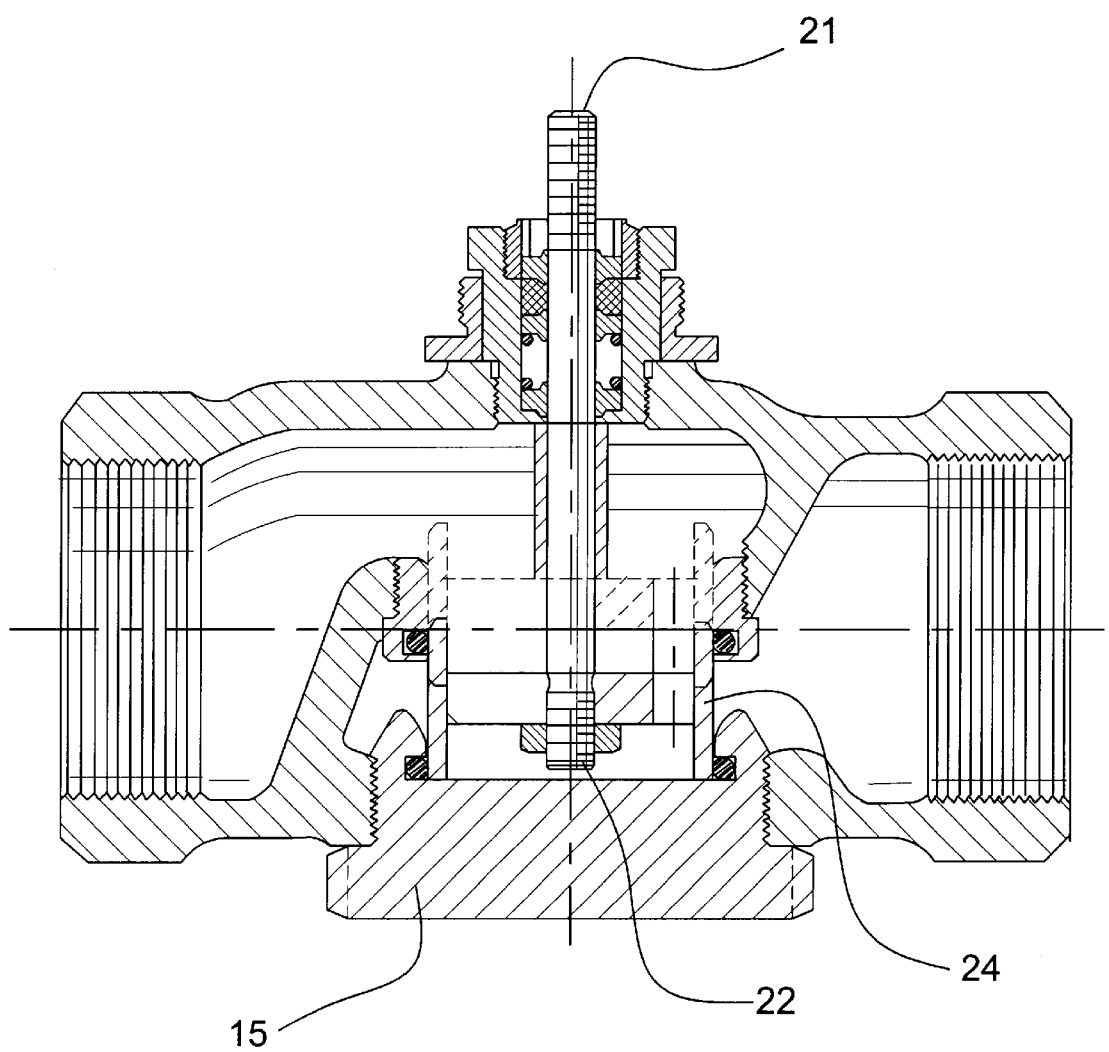
FIG. 7 is a cross-section of a two-way balanced plug valve having a stem down closed configuration utilizing contoured walls pursuant to an embodiment of the present invention with the contoured walls outside the movable plug.

In FIGS. 7 and 8, valve stem 21 is configured such that plug 24 is mounted closer to the internal valve stem end 22 than in valve 10 of FIG. 1. In addition, valve stem 21 does not slide through bonnets 15 and 63.

Figure 9:
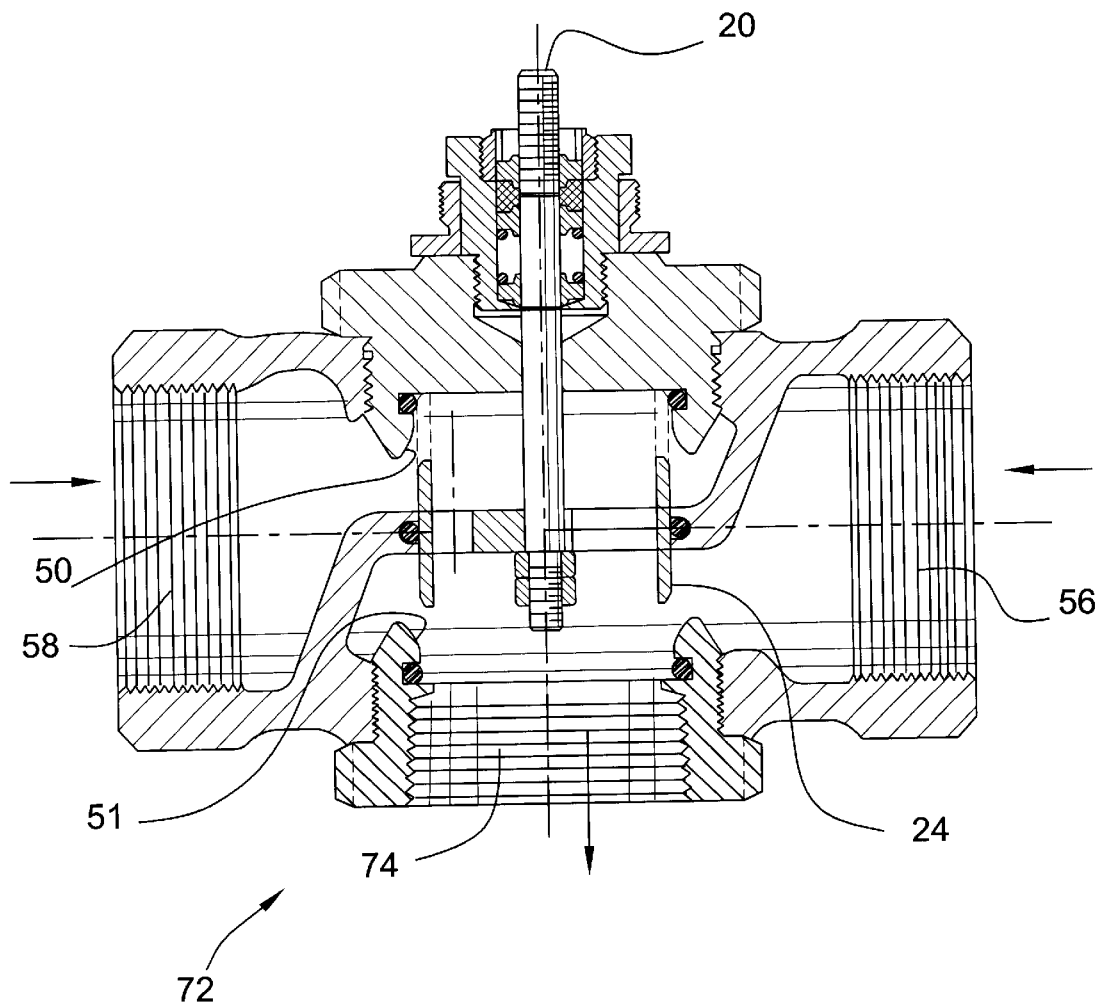
FIG. 9 is a cross-sectional schematic of a three-way balanced mixing valve utilizing contoured walls pursuant to an embodiment of the present invention.
Figure 10:
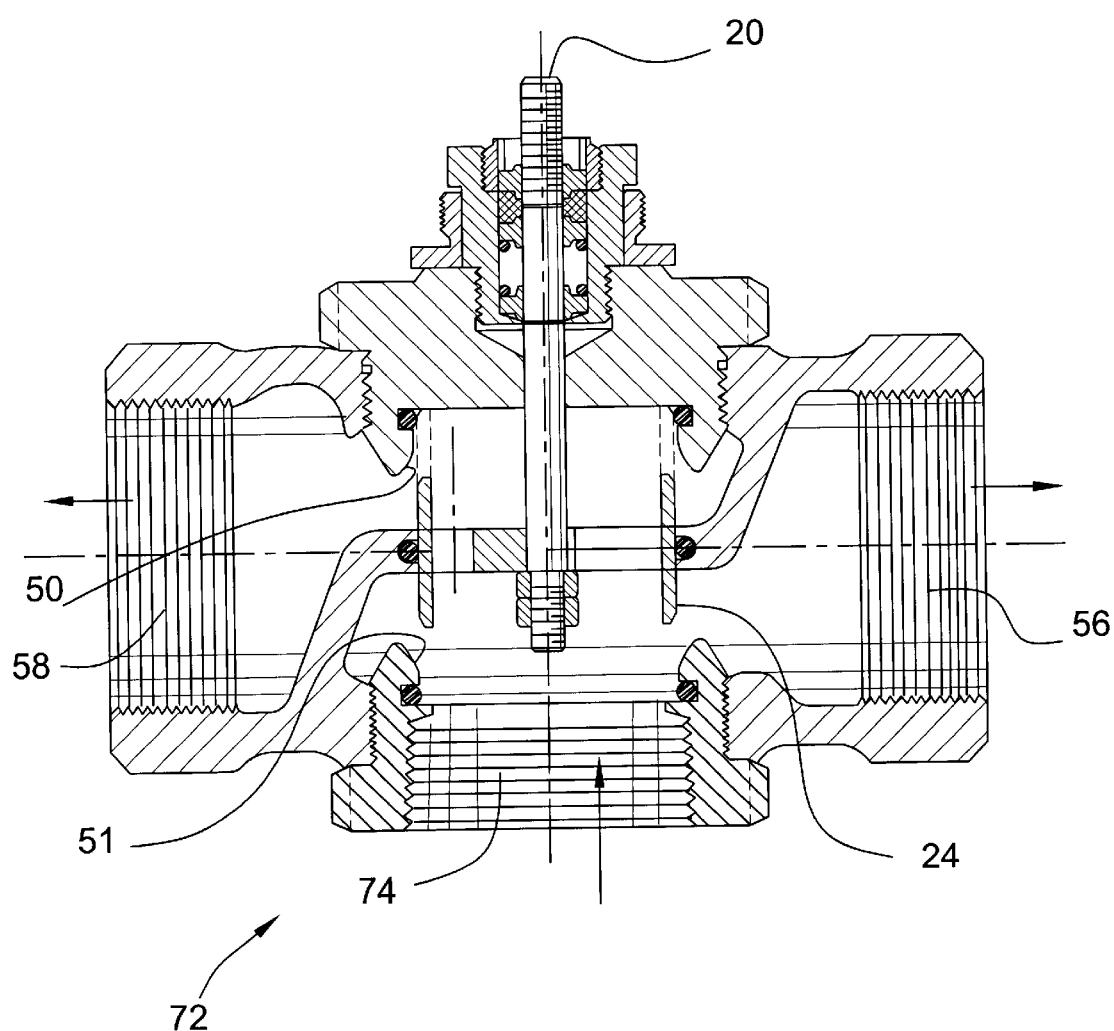
FIG. 10 is a cross-sectional schematic of a three-way balanced diverting valve utilizing contoured walls pursuant to an embodiment of the present invention.

FIG. 9 is a 3-way balanced mixing valve 72. The contoured walls 50 and 51 are similar to those of the valve 10 of FIG. 1, however, there are two contoured walls 50 and 51 due to the additional port 74. The valve 76 of FIG. 10 is mechanically identical to FIG. 9, but the flow direction is reversed, making valve 76 a diverting valve.

There are many advantages associated with the use of balanced plug valves having contoured walls over conventional valves. With regard to flow control, there exists an ability to close and open the valve against virtually any pressure-to-body rating. There is also an increased rangeability for controlling low flows. Physical improvements include no seat damage due to chattering impact at closing; less guide damage and noise due to vibration in the plug guide; long seat life due to reduced erosion; and greatly improved packing life due to reduced stem loads and smooth stem motion. The balanced plug prevents slamming shut of the valve and hammering regardless of flow direction. The actuator for a balanced plug valve with contoured walls can be smaller, lighter and less expensive because the force requirements are less than those of conventional valves. The variation in the contour of the wall provides for customized response and better control of the flow rates. In fact, the contoured wall creates innumerable possibilities for creating different flow characteristics within a given valve body relative to the stroke distance of the plug and the input from the actuator.

Certain changes may be made in the above described, without departing from the spirit and scope of the invention herein involved. It is intended that all of the subject matter of the above description or shown in the accompanying drawings shall be interpreted merely as examples illustrating the inventive concept herein. The description and illustrations shall not be construed as limiting the invention. Rather, it is intended that the invention be limited only to the extent required by the appended claims and the applicable rules of law.

What is claimed is:

1. A balanced plug valve, comprising:
   a valve body having an inlet port and and outlet port;
   a balanced plug mounted on a valve stem and having a plug wall, an edge of said plug wall having a bulging tapered profile with regard to adjacent surfaces of the plug wall, said balanced plug having an opening extending therethrough; and,
   at least one contour wall having a tapered contour surface proximal to an end of said balanced plug, wherein the contour surface defines a gap with said balanced plug at open plug positions which characterizes fluid flow through said opening in said balanced plug between said inlet and outlet ports and wherein the contour shaped wall has varying radii of curvature at varying locations along said contour shaped wall.

2. The balanced plug valve according to claim 1, further comprising an o-ring type seal mounted within a groove at a base of said wall for the purpose of preventing fluid flow past said balanced plug while in a closed position.

3. The balanced plug valve according to claim 1, further comprising a guide formed from said valve body for the purpose of stabilizing said balanced plug.

4. The balanced plug valve according to claim 3, further comprising an o-ring type seal mounted within a groove of said guide.

5. The balanced plug valve according to claim 1, wherein said balanced plug is generally cylindrical in shape.

6. The balanced plug valve according to claim 1, wherein said balanced plug is sized relatively smaller than said contour shaped wall, such that said balanced plug sealingly fits within said contour shaped wall while in said closed position.

7. The balanced plug valve according to claim 1, wherein said balanced plug is sized relatively larger than said contour shaped wall, such that said contour shaped wall sealingly fits within said balanced plug while said balanced plug is in said closed position.

8. The balanced plug valve according to claim 1, wherein said wall begins at a first end with a relatively small radius of curvature which increases gradually at each subsequent location along said wall toward a second end which has a relatively large radius of curvature.

9. The balanced plug valve according to claim 1, wherein said contour shaped wall begins at a first end with a relatively large radius of curvature which decreases gradually at each subsequent location along said wall toward a second end which has a relatively small radius of curvature.

10. The balanced plug valve according to claim 1, wherein said balanced plug valve has one input port and one output port.

11. The balanced plug valve according to claim 1, wherein said balanced plug valve has one input port and two output ports.

12. The balanced plug valve according to claim 11, wherein said balanced plug valve has two contour shaped walls.

13. The balanced plug valve according to claim 1, wherein said balanced plug valve has two input ports and one output port.

14. The balanced plug valve according to claim 13, wherein said balanced plug valve has two contour shaped walls.

15. The balanced plug valve of claim 1 wherein the plug wall edges are chamfered.

16. A balanced plug valve, comprising:

a valve body having an inlet port and an outlet port;

a balanced plug mounted on a valve stem and having a plug wall, an edge of said plug wall having a bulging tapered profile with regard to adjacent surfaces of the plug wall, said balanced plug having an opening extending therethrough;

at least one contour wall having a tapered contour surface proximal to an end of said balanced plug, wherein the contour surface defines a gap with said balanced plug at open plug positions which characterizes fluid flow through said opening in said balanced plug between said inlet and outlet ports; and, an o-ring type seal mounted with a groove at a base of said contour wall for the purpose of preventing fluid flow past said balanced plug while in a closed position.

17. The balanced plug valve of claim 16 wherein the plug wall edges are chamfered.

18. The balanced plug valve of claim 16 wherein said balanced plug is generally cylindrical in shape.

19. The balanced plug valve of claim 16 wherein said balanced plug is sized relatively smaller than said contour wall such that the edge of said balanced plug fits within said contour wall when in a closed position.

20. The balanced plug valve of claim 16 wherein said contour surface has varying radii of curvature at varying locations along said contour surface.

21. A balanced plug valve, comprising:

a valve body having an inlet port and an outlet port;

a balanced plug mounted on a valve stem and having a plug wall, an edge of said plug wall having a bulging tapered profile with regard to adjacent surfaces of the plug wall, said balanced plug having an opening extending therethrough; and, at least one contour wall having a tapered contour surface proximal to an end of said balanced plug, wherein the continuous curved surface defines a gap with said balanced plug at open plug positions which characterizes fluid flow through said opening in said balanced plug between said inlet and outlet ports;

wherein said balanced plug is sized relatively smaller than said contour wall such that said balance plug sealingly fits within said contour shaped wall when said balanced plug is in a closed position.

22. The balanced plug valve of claim 21 wherein the plug wall edges are chamfered.

23. The balanced plug of claim 21 wherein said balanced plug is generally cylindrical in shape.

24. The balanced plug of claim 21 wherein said balanced plug is sized relatively smaller than said contour wall such that said balanced plug fits within said contour wall when in a closed position.

25. The balanced plug of claim 21 wherein said contour surface has varying radii of curvature at varying locations along said contour surface.

26. A balanced plug valve, comprising:

a valve body having an inlet port and an outlet port;

a balanced plug mounted on a valve stem and having a plug wall, an edge of said plug wall having a bulging tapered profile with regard to adjacent surfaces of the plug wall, said balanced plug having an opening extending therethrough; and, at least one contour wall having a tapered contour surface proximal to an end of said balanced plug, wherein the contour surface defines a gap with said balanced plug at open plug positions which characterizes fluid flow through said opening in said balanced plug between said inlet and outlet ports and wherein the contour wall begins at a first end with a relatively small radius of curvature which increases gradually at each subsequent location along said contour wall toward a second end which has a relatively large radius of curvature.

* * * * *